Jan. 9, 1940.    R. F. EDGAR    2,186,826
ECCENTRICITY INDICATOR
Filed Sept. 12, 1936    2 Sheets-Sheet 1
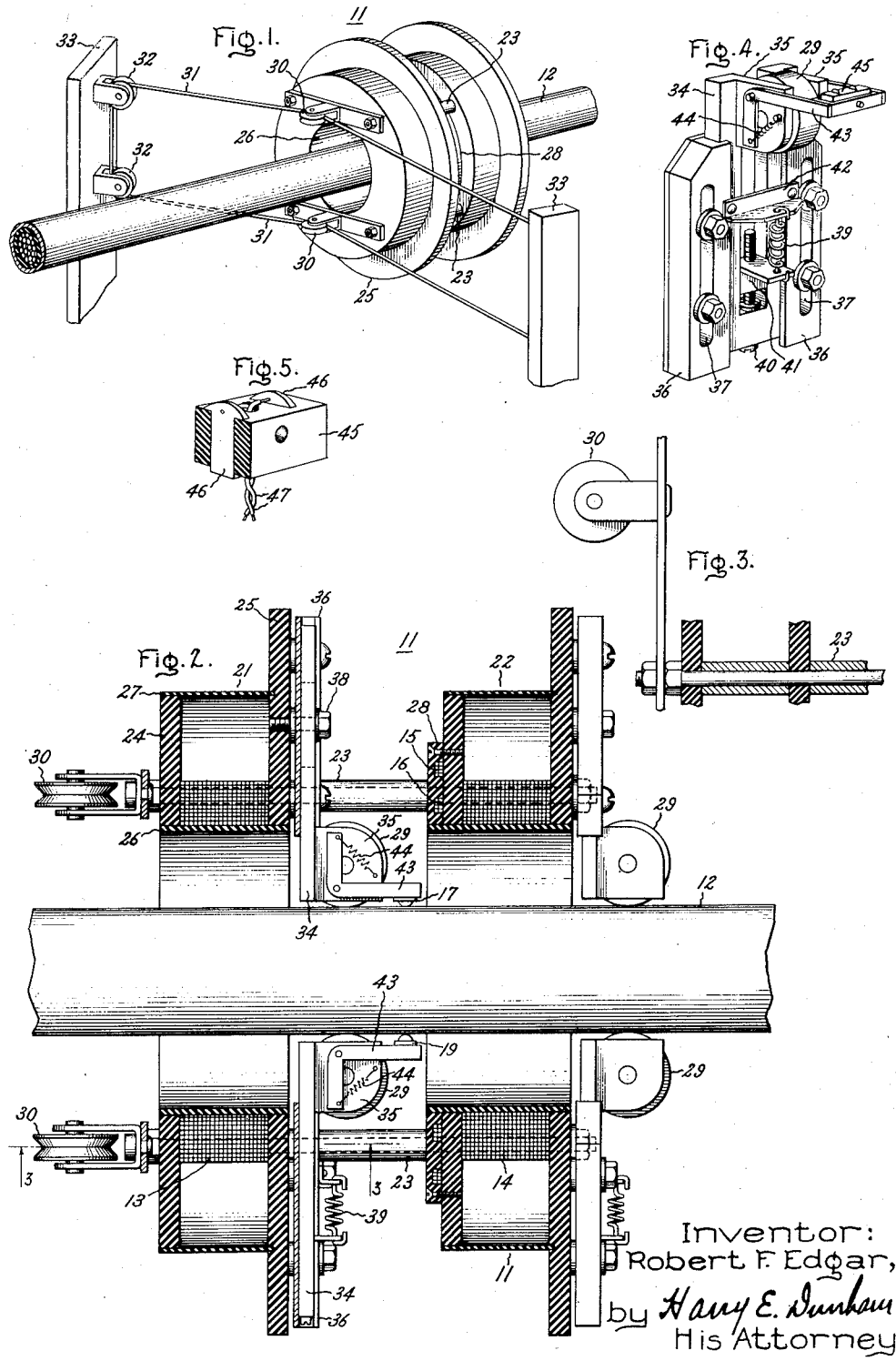
Inventor:
Robert F. Edgar,
by Harry E. Dunham
His Attorney.

Jan. 9, 1940.   R. F. EDGAR   2,186,826
ECCENTRICITY INDICATOR
Filed Sept. 12, 1936   2 Sheets-Sheet 2
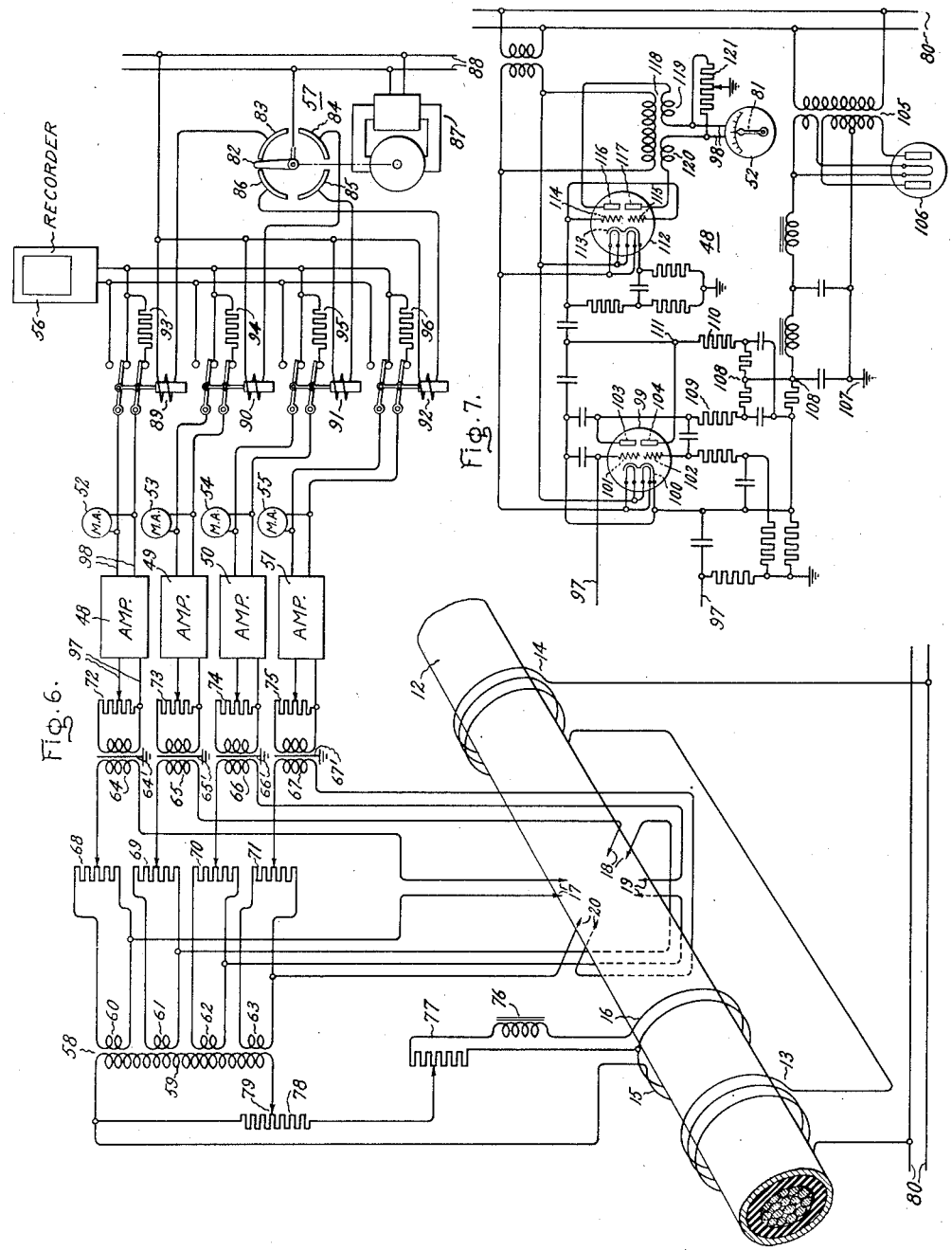
Inventor:
Robert F. Edgar,
by Harry E. Dunham
His Attorney.

Patented Jan. 9, 1940

2,186,826

UNITED STATES PATENT OFFICE 2,186,826

ECCENTRICITY INDICATOR

Robert F. Edgar, Schenectady, N. Y., assignor to General Electric Company, a corporation of New York Application September 12, 1936, Serial No. 100,526

7 Claims. (Cl. 175—183)

My invention relates to electromagnetic testing apparatus and methods and concerns particularly eccentricity indicators for lead sheaths used on cables and for pipes and tubes in general.

It is an object of my invention to provide a continuously indicating or recording apparatus and method for gauging lead cable sheath as it comes from the press. It is more specifically an object of my invention to provide such apparatus for directly reading eccentricity of the lead sheath in terms of its average thickness.

It is an object of my invention to provide similar apparatus for continuously gauging or testing any kind of tubing or pipe composed of metal or other conducting material.

It is likewise my object to provide a non-destructive test for cable sheath and for tubing.

It is a further object of my invention to provide apparatus indicating whether any eccentricity represents greater or less than an average thickness and indicating which side of the cable sheath is relatively too thick or too thin.

Still another object of my invention is to provide an electric valve detector circuit for obtaining a directional effect in the measurement of alternating current circuits.

Other and further objects and advantages will become apparent as the description proceeds.

In carrying out my invention in its preferred form I provide a test frame through which cable to be tested may be passed directly after leaving the lead press. The test frame supports exciting and compensating coils surrounding the cable and pick-up points arranged along the circumference of the cable, i. e., the circumference of the circle bounding a cross-section of the cable. The pick-up points are connected in series with the compensating coils to the input terminals of an amplifier, which actuates suitable indicating or recording instruments. The compensating coils are connected to balance out the voltage induced in the pick-up points when the sheath thickness is normal and thus provide a recording in terms of eccentricity. One of the compensating coils contains an adjustable amount of inductance in order to correct for difference in phase relationship between the exciting and induced currents or voltages.

The invention will be understood more readily from the following detailed description when considered in connection with the accompanying drawings, and those features of the invention which are believed to be novel and patentable will be pointed out in the claims appended hereto. In the drawings, Fig. 1 is a view in perspective of a portion of a lead sheath cable being tested and a test frame forming an embodiment of my invention; Fig. 2 is a side elevation principally in section of the apparatus of Fig. 1; Fig. 3 is a fragmentary view partly in cross-section representing the part of the apparatus of Fig. 2 cut by the plane 3—3; Fig. 4 is a perspective view of one of the yieldably mounted cable guide rollers of the apparatus of Figs. 1 and 2, together with the adjustable mounting and a pair of voltage pick-up points or contacts; Fig. 5 is a detailed perspective view partly in section of one of the voltage pick-up contact units utilized in the apparatus; Fig. 6 is a circuit diagram of the apparatus; and Fig. 7 is a detailed circuit diagram of one of the amplifiers represented by boxes marked "AMP." in Fig. 6. Like reference characters are utilized to designate like parts throughout the drawings.

Referring now more in detail to the drawings the apparatus illustrated comprises a test frame 11 (Figs. 1 and 2) surrounding and freely riding upon a lead-sheath cable 12 being tested, and auxiliary apparatus such as amplifiers and electrical instruments shown more in detail in Fig. 6, and to be described hereinafter. The test frame 11 may be mounted close to the cable ejecting orifice of a lead press (not shown, but assumed to be beyond the left-hand edge of the drawing).

The test frame 11 carries a pair of exciting coils 13 and 14 connected in series, a pair of compensating coils 15 and 16 (Fig. 2) or a single compensating coil with a tap dividing it into two parts 15 and 16 (Fig. 6) and four pairs of contacts or voltage pick-up units 17, 18, 19, and 20 (Fig. 6) arranged circumferentially around the cable. Structurally the test frame 11 consists of two units 21 and 22 bolted together against spacer bushings 23. The unit 21 consists of a spool for the exciting winding 13 formed by a pair of spaced disks 24 and 25 with centers cut out to receive a length of tubing 26. For better protection of the coil 13 a second length of tubing 27 may be placed around the disk 24 and against the disk 25 to enclose the coil 13. Preferably the pieces 24, 25, 26, and 27 are composed of insulating material. The unit 22 is similar in construction to unit 21 but has mounted thereon, in addition, an annulus 28 with annular grooves for the coils 15 and 16, and the annulus is preferably composed of molded insulating material.

For maintaining the test frame 11 with the cable 12 substantially centered therein four cable guide rollers are secured to each of the units 21 and 22 of the test frame and for preventing the test frame from being dragged along by the moving cable 12 a pair of pulleys 30 is secured to the frame 11, suitable guide wires 31 being stretched cross-wise for holding back the pulleys 30. Preferably the supports for the wire 31 consist of posts 33 or some other stationary members. One or both of the posts 33 may carry pulleys 32 and the wire 31 is passed around the pulleys 32 and over the pulleys 30. In this way the test frame 11 is free not merely to sway from side to side with the cable 12 but is also free to twist around either horizontal or vertical axes with the cable if the latter bends.

The cable guide rollers 29 are mounted around the cable 90° apart and one of each pair of diametrically opposite guide rollers has a slidable mounting with a spring for urging it toward the cables. The other mounting of the pair is bolted in a fixed position. However, both mountings of each pair may be adjusted by loosening proper bolts in order to permit using the test frame with different sizes of cable. Referring to the pair of rollers 29 mounted on the disk 25 shown in Fig. 2 and referring to Fig. 4 showing one of the slidable roller mountings it will be seen that each of the roller mountings consists of a forked piece 34 with lateral projections 35 in which the rollers 29 are journaled and channel-forming blocks 36 bolted to the disk 25. The blocks 36 are so shaped as to form channels or grooves in which the pieces 34 are slidably held, and the blocks 36 have elongated bolt holes 37 in order that their positions on the disk 25 may be adjusted for different sizes of cable.

There is a bolt 38 for holding one of the roller-carrying forked pieces 35 in a normally fixed but adjustable position but the diametrically opposite forked piece of the pair is left freely slidable between the blocks 36. A spring 39 is provided for urging the roller 29 toward the cable 12 and fixing the position of the test frame 11 with respect to the cable. In order to adjust the tension of the spring 39 a spring-adjusting bolt 40 on the slidable forked piece 34 and a threaded slidable block 41 engaging the bolt 40 may be provided. There is a transverse piece 42 fastened to the blocks 36, and the spring 39 is attached at either end to the piece 42 and the block 41.

The roller carrying pieces 34 serve also to carry the mountings for the voltage pick-up units 17 to 20. Each of the units 17 to 20 is mounted on one end of a forked bell crank 43, pivoted on a roller carrying unit 34. Springs 44 are provided for holding the pick-up units 17 to 20 against the surface of the cable 12. Each of the pick-up units 17 to 20 consists of an insulating block 45 (Fig. 5) in which are set two metallic contacts 46, a suitable pair of conductors 47 being connected to the contacts 46 for connection with the electrical circuit.

The electrical circuit is shown in Fig. 6, from which it will be seen that there is an operative series connection between each of the contact units 17 to 20, the compensating coils 15 and 16, and the current responsive units corresponding to each contact unit. The current responsive units consist of amplifiers 48 to 51 and milliammeters 52 to 55 corresponding, respectively to contact units 17 to 20, and a curve-drawing milliammeter or recorder 56 which may be common to all the contact units since I employ a rotating switch 57 for causing the recorder 56 to respond to each of the contact units in succession. The operative connection of each contact unit separately to its corresponding amplifier in series with the compensating coils 15 and 16 is accomplished through the medium of a compensating coil transformer 58 having a single primary winding 59 conductively connected in series with certain adjustable resistances to the compensating coils 15 and 16, and having four separate secondary windings 60 to 63 corresponding to the contact units 17 to 20, respectively. Separate input transformers 64 to 67 are also provided corresponding to the respective contact units. Preferably the transformers 64–67 have grounded electrostatic shields 64' to 67' between windings, and are also magnetically shielded. For individually adjusting the degree of compensation, potentiometers 68 to 71 are provided and for individually adjusting amplifier sensitivity potentiometers 72 to 75 are provided.

An understanding of the operative connection may be obtained by considering the arrangement with respect to one of the pairs of contacts, for example, the contacts 17. The contacts 17 are conductively connected in series with the secondary winding 60 of the compensating coil transformer 58 and the primary winding of the amplifier input transformer 64. The winding 60, however, is inductively connected to the compensating coils 15 and 16, which are in series. Likewise the primary winding of the transformer 64 is inductively connected to the amplifier 48 and, through the latter, operatively connected to the milliammeter 52. The voltage pick-up contacts 17, therefore are operatively connected in series with the compensating coils 15 and 16 and the milliammeter 52.

An inductance 76 is connected in series with compensating coil 16 in order to compensate for the difference in phase between the voltages induced in the compensating coil 15 and in the cable sheath 12, and a potentiometer 77 is connected across the coil 16 and the inductance 76, in order that the degree of phase compensation may be adjusted to obtain the required amount. The compensating coil 15 is connected in series with the output side of the potentiometer 77 across the potentiometer 78 so that by adjusting the tap 79 the compensating voltage applied to the transformer 58 may be varied.

The operation of the apparatus is as follows: The cable 12 travels to the right through the exciting coils 13 and 14 which are energized with alternating current by a suitable source 80. By transformer action, currents are induced which circulate about the sheath. The current within the sheath and the voltage drop between two points on a circumference thereof depend upon the resistance of the sheath which in turn depends upon its thickness. If the cable sheath is perfectly uniform equal voltage drops will occur between each of the pairs of pick-up points, 17, 18, 19, and 20, but if the cable is eccentric the resistance and the voltage drop will be higher where the cable sheath is thinner. In order to eliminate the voltage which occurs between the contact points when there is no eccentricity the compensating coils 15 and 16 are provided, and the reading obtained represents eccentricity instead of actual thickness. The voltage of the compensating coils represents average sheath thickness and the voltage between any pair of pick-up points depends on actual thickness where the pair of pick-up points is located. Only one pair of pick-up points is actually necessary for determining eccentricity.

The current flowing in the cable sheath causes the flux within the sheath to be out of phase with the flux outside the sheath and prevents the voltage induced in any coil outside the sheath from being in phase with the voltage drop around the sheath. Consequently complete compensation cannot be obtained with the compensating coil 15 alone. The inductance 76 in series with the compensating coil 16, however, brings the resultant compensating voltage of the coils 15 and 16 in phase with the voltage drop induced in the cable sheath 12.

The amplifiers 48 to 51 are so designed, in a manner which I shall later explain, that a directional effect is obtained, and the milliammeters 52 to 55 as well as the recorder 56 are center zero instruments. Accordingly, if the voltage between the points 17 is greater than the compensating voltage the pointer 81 (Fig. 7) of the milliammeter 52 (Fig. 6) will deflect in one direction but if the voltage between the parts 17 is less than the compensating voltage the pointer 81 deflects in the opposite direction. The instrument 52 thus indicates whether the side of the cable passing under the contacts 17 is thicker or thinner than the average and the instrument may be calibrated in terms of percent eccentricity.

In order that the eccentricity at the top, sides, and bottom of the cable may be continuously compared, I provide the curve drawing instrument 56 and the rotating switch 57 for placing the contacts 17 to 20 in operative connection with the recorder 56 successively. The switch 57 includes a rotating contact 82 and four fixed contacts 83, 84, 85, and 86. A synchronous motor 87 is provided for rotating the contacts 82 at uniform speed and is energized by an alternating current source 88 or the source 80. Instead of utilizing a direct connection between the rotating switch 57 and the recorder 56, I provide a plurality of electromagnetic double-throw switches 89, 90, 91, and 92. I also provide a plurality of recorder-simulating resistance shunts 93, 94, 95, and 96, having the same resistance as the instrument 56.

The switches 89 to 92 are so arranged that at all times each of the milliammeters has either the recorder 56 or one of the resistances 93 to 96 in shunt with it so that the readings of the milliammeter are not affected by having the recorder connected successively in shunt with different milliammeters, under control of the rotary switch 57. It is thus apparent that a flat record curve produced by the recorder 56 will indicate a uniform cable whereas a wavy curve will represent eccentricity. If desired, the record chart in the recorder may be driven at a speed corresponding to the speed of the cable 12, or a separate curve may be provided for indicating the length of cable passed and enabling the operator to locate eccentric portions in the cable sheath after the eccentric portion of the cable has passed the test frame.

The amplifiers 48 to 51 are of the resistance coupled type having two stages in one tube and are all alike. The numerals 97 and 98 are used to designate corresponding points in Figs. 6 and 7, on the input and output sides respectively of one of the amplifiers. There is an electric valve 99 preferably a vacuum tube, with a cathode 100, a pair of control electrodes or grids 101 and 102 and a pair of anodes or plates 103 and 104. For energizing the plate circuits there is a power pack (not forming part of my invention) consisting of the transformer 105, the rectifier 106 and suitable filtering inductances and condensers so as to produce a substantially uniform voltage between the ground 107 and a terminal 108. From the terminal 108 two plate circuits may be traced, one through the resistor 109 and the first stage plate 103 to the cathode 100 and the other through the resistor 110 and the second stage plate 104. Variations in voltage between the conductors 97 are applied between the cathode 100 and the grid 101, and are amplified in the form of variations in plate current through the resistor 109. The second grid 102 is tied to this resistor 109 and further amplification takes place by reason of the control by the grid 102 of the plate circuit of the plate 104, through the resistor 110. Amplified potential variations occur at the terminal 111 of the resistor 110. The terminal 111 is thus the output terminal of the second stage.

For further amplification and directional response a second tube 112 is provided also having an anode 113, a pair of control electrodes or grids 114 and 115 and a pair of anodes or plates 116 and 117. For supplying plate current to the tube 112 there is a transformer 118 energized indirectly by the source 80 and having a pair of independent secondary windings 119 and 120 connected with opposite polarities to the plates 116 and 117 and to the ends of a resistor 121 having a grounded midpoint. The midpoint may be adjustable to compensate for slight differences in tube characteristics. The deflecting instrument 52 is connected across the resistor 121. Obviously the resistor 121 may be eliminated if the instrument 52 is of the type having two separate opposing windings connected to the secondaries 119 and 120 respectively.

Although I have shown an arrangement having what are in effect six-element tubes 99 and 112 it will be understood that my invention is not limited to this specific arrangement but obviously includes using pairs of three element tubes with the cathodes of each pair connected together and with the grids and plates also connected in the manner shown in Fig. 7.

Both grids 114 and 115 are connected to the output terminal 111 of the preceding stage. Since, however, the plates 116 and 117 are supplied with alternating voltages of opposite polarities, only one of them can be at positive potential when the grids 114 and 115 are at maximum potential and consequently one plate passes more current than the other or only one of them passes any current, as the case may be. The plate current flows to ground through the resistor 121 and one end or the other of the resistor 121 is at higher potential depending upon which of plates 116 or 117 passes the greater current. Accordingly, the instrument 52 deflects in one direction or the other, depending on which plate has its voltage in phase with that of the grids 114 and 115. It will be understood that the instrument 52 employed is, a direct-current instrument of the directional type such as a d'Arsonval galvanometer, for example.

Returning to Fig. 6 and the contacts 17 to 20, it will be seen that if the voltage at the contacts is greater than the opposing voltage from the compensating coils 15 and 16, the voltage input to the amplifiers will have a given phase relationship but if the voltage at the contacts 17 to 20 is less than the opposing compensating voltage the voltage input to the amplifiers will have a phase relationship differing by 180° from that for the former assumption. Accordingly, the phase relationship of the voltage on the grids 114 and 115 in Fig. 7 and likewise the direction of deflection of the instruments 52 to 56 are determined by whether the cable sheath thickness is over or under average at the pair of contact points in question.

It will be observed that, with this apparatus, it is unnecessary to provide for relative rotation between the cable under test and the contact points thereon.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A cable sheath eccentricity indicator comprising in combination, an exciting coil adapted to surround a sheath to be tested, a compensating coil adapted to surround the sheath, a second compensating coil with inductance in circuit therewith, said second compensating coil also being adapted to surround the sheath, a pair of contact points adapted to touch adjacent points on a circumference of a cable sheath to be tested, and current responsive apparatus connected in series operative relation with said points and said compensating coils.

2. An eccentricity indicator for tubing composed of electrically conducting material, said indicator comprising in combination an exciting coil adapted to surround tubing to be tested, a compensating coil adapted to surround the tubing, a pair of contacts adapted to touch points on a circumference of the tubing, and current responsive apparatus operatively connected in series relation with said contacts and said compensating coil, the connections being such that voltage induced in said compensating coil acts in opposition to voltage induced circumferentially in the tubing.

3. An eccentricity indicator for tubing composed of electrically conducting material, said indicator comprising in combination an exciting coil adapted to be connected to a source of alternating current and adapted to surround tubing to be tested, a compensating coil also adapted to surround the tubing, a pair of contacts adapted to touch points on a circumference of the tubing and directionally responsive alternating current-responsive apparatus operatively connected in series relation with said contacts and said compensating coil, the connections being such that voltage induced in said compensating coil acts in opposition to voltage induced circumferentially in the tubing, and the electrical dimensions being such that the opposing voltages are balanced in case the contacts are against a portion of the tubing of average thickness.

4. An eccentricity indicator for tubing composed of electrically conducting material, said indicator comprising in combination an exciting coil adapted to surround tubing to be tested, a compensating coil also adapted to surround the tubing, a plurality of pairs of contacts adapted to touch points on a circumference of the tubing, current responsive apparatus and means for operatively connecting said current responsive apparatus in series relation with said compensating coil and different ones of said pairs of contacts successively, the connections being such that voltage induced in said compensating coil opposes that induced circumferentially in the tubing.

5. An eccentricity indicator for tubing composed of electrically conducting material, said indicator comprising in combination an exciting coil adapted to surround tubing to be tested, a compensating coil also adapted to surround the tubing, a compensating coil transformer having a primary winding connected to said compensating coil and a plurality of secondary windings, a plurality of pairs of contacts adapted to touch points on a circumference of the tubing, and a plurality of current responsive devices, each operatively connected in series with one of said secondary windings and one of said pairs of contacts, the connection being such that voltages induced in said compensating coil secondary windings oppose that induced circumferentially in the tubing.

6. A test-frame for continuously testing tubing adapted to pass therethrough, said frame comprising a pair of supporting members each carrying a plurality of circumferentially mounted guide rollers, a plurality of pairs of voltage-pick-up contacts circumferentially mounted resiliently on one of said members, an exciting coil and a compensating coil, both the latter being mounted on said supporting members in such a manner as to surround tubing passed through the frame.

7. An eccentricity indicator for tubing composed of electrically conducting material, said indicator comprising in combination an exciting coil adapted to surround tubing to be tested, a compensating coil adapted to surround the tubing, a pair of contacts adapted to touch points on a circumference of the tubing, a directional alternating-current responsive device having input connections operatively in series relation with said contacts and said compensating coil, the connections being such that voltage induced in said compensating coil acts in opposition to voltage induced circumferentially in the tubing, said current-responsive device comprising in combination electric valve apparatus including cathode means, control electrode means, and a pair of anodes, said input connections being between said cathode and control grid means, means for applying alternating voltage of opposite instantaneous polarity to said anodes, a center-zero direct-current responsive indicating instrument connected in responsive relation to circuits formed through said anode voltage applying means and said respective anodes to said cathode means, a curve-drawing instrument, a resistor with a resistance equal to that of the curve-drawing instrument, and a double-throw switch for alternatively connecting said resistor or said curve-drawing instrument to said indicating instrument.

ROBERT F. EDGAR.

DISCLAIMER 2,186,826.—*Robert F. Edgar*, Schenectady, N. Y. ECCENTRICITY INDICATOR. Patent dated January 9, 1940. Disclaimer filed June 10, 1941, by the assignee, *General Electric Company*.

Hereby enters this disclaimer to claims 2, 3, and 4 of said Letters Patent.

[*Official Gazette July 8, 1941.*]